(12) United States Patent
Daya et al.

(10) Patent No.: US 9,348,646 B1
(45) Date of Patent: May 24, 2016

(54) REBOOT-INITIATED VIRTUAL MACHINE INSTANCE MIGRATION

(71) Applicant: Amazon Technologies, Inc., Reno, NV (US)

(72) Inventors: Marc Nevin Daya, Cape Town (ZA); Diwakar Gupta, Seattle, WA (US); Kevin Robert Scaife, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/492,945

(22) Filed: Sep. 22, 2014

(51) Int. Cl.
*G06F 9/455* (2006.01)
*G06F 9/48* (2006.01)

(52) U.S. Cl.
CPC .......... *G06F 9/4856* (2013.01); *G06F 9/45558* (2013.01)

(58) Field of Classification Search
CPC .............................. G06F 9/4856; G06F 9/4862
USPC ...................................................... 718/1–107
See application file for complete search history.

(56) References Cited

U.S. PATENT DOCUMENTS

| | | | | |
|---|---|---|---|---|
| 5,519,867 | A * | 5/1996 | Moeller | G06F 9/4428 710/200 |
| 6,298,370 | B1 * | 10/2001 | Tang | G06F 9/5044 718/100 |
| 7,234,139 | B1 * | 6/2007 | Feinberg | G06F 9/45504 718/1 |
| 7,849,347 | B2 * | 12/2010 | Armstrong | G06F 9/4856 713/400 |
| 7,962,915 | B2 * | 6/2011 | Eshel | G06F 11/2025 714/2 |
| 8,375,386 | B2 * | 2/2013 | Hendel | G06F 9/45533 714/37 |
| 8,429,651 | B2 * | 4/2013 | Donnellan | G06F 9/45558 718/1 |
| 8,484,653 | B2 * | 7/2013 | Tsirkin | G06F 9/45533 709/220 |
| 8,544,004 | B2 * | 9/2013 | Fultheim | G06F 9/45533 718/1 |
| 8,799,413 | B2 * | 8/2014 | Taylor | G06F 17/30215 709/219 |
| 8,806,486 | B2 * | 8/2014 | Martin | G06F 9/45533 709/231 |
| 8,826,272 | B2 * | 9/2014 | Glikson | G06F 9/4856 709/226 |
| 8,850,430 | B2 * | 9/2014 | Hayward | G06F 9/455 709/223 |

OTHER PUBLICATIONS

Massó et al, "Direct Manipulation of User Interfaces for Migration", ACM, pp. 140-147, 2006.*
Sapuntzakis et al, "Optimizing the Migration of Virtual Computers", ACM, pp. 377-390, 2002.*
Zahid et al, "Transaction Synchronization Protocol using XML n Client-Server Environment", ACM, pp. 19-20, 2009.*
Yee et al, "A Framework for Designing Update Objects to Improve Server Scalability in Intermittently Synchronized Databases", ACM, pp. 54-61, 2000.*
Bartholomäuset al, "Improving the Concurrent Updates of Replicated Global Objects in Multi-Server Virtual Environments", ACM, pp. 320-327, 2011.*
Begole et al, "Resource Sharing for Replicated Synchronous Groupware", IEEE/ACM Transactions on Networking, vol. 9, No. 6, pp. 833-843, 2001.*

\* cited by examiner

*Primary Examiner* — Anil Khatri
(74) *Attorney, Agent, or Firm* — Klarquist Sparkman, LLP

(57) ABSTRACT

A method for migrating a virtual machine instance within a service provider environment may include determining to migrate an instance running on a source server computer, the source server computer associated with a plurality of hardware resource settings. A target server computer may be identified based at least in part on the plurality of hardware resource settings. A local data volume of the target server computer may be synchronized with a local data volume of the source server computer. A notification may be sent to the user, indicating migration of the instance can be initiated. Upon receiving a reboot request, disconnecting at least one network interface attached to the instance. The instance may be terminated from running on the source server computer, and may be launched on the target server computer using the synchronized local data volume and instance state data.

20 Claims, 9 Drawing Sheets

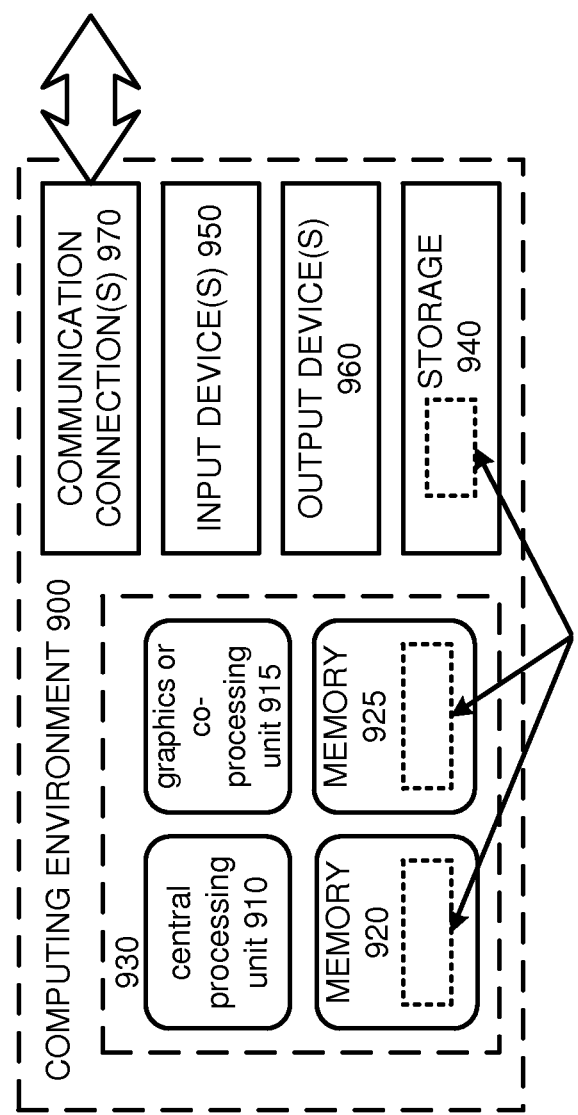

REBOOT-INITIATED VIRTUAL MACHINE INSTANCE MIGRATION

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs.

With the increased use of cloud computing resources, some cloud computing environments may be inefficient in managing resource allocation. Additionally, multiple application installations and reboots may cause latencies, contributing to the inefficient use of the cloud computing environment resources.

BRIEF DESCRIPTION OF THE DRAWINGS

Various embodiments in accordance with the present disclosure will be described with reference to the drawings, in which:

FIG. 9 depicts a generalized example of a suitable computing environment in which the described innovations may be implemented.

DETAILED DESCRIPTION

Figure 1:
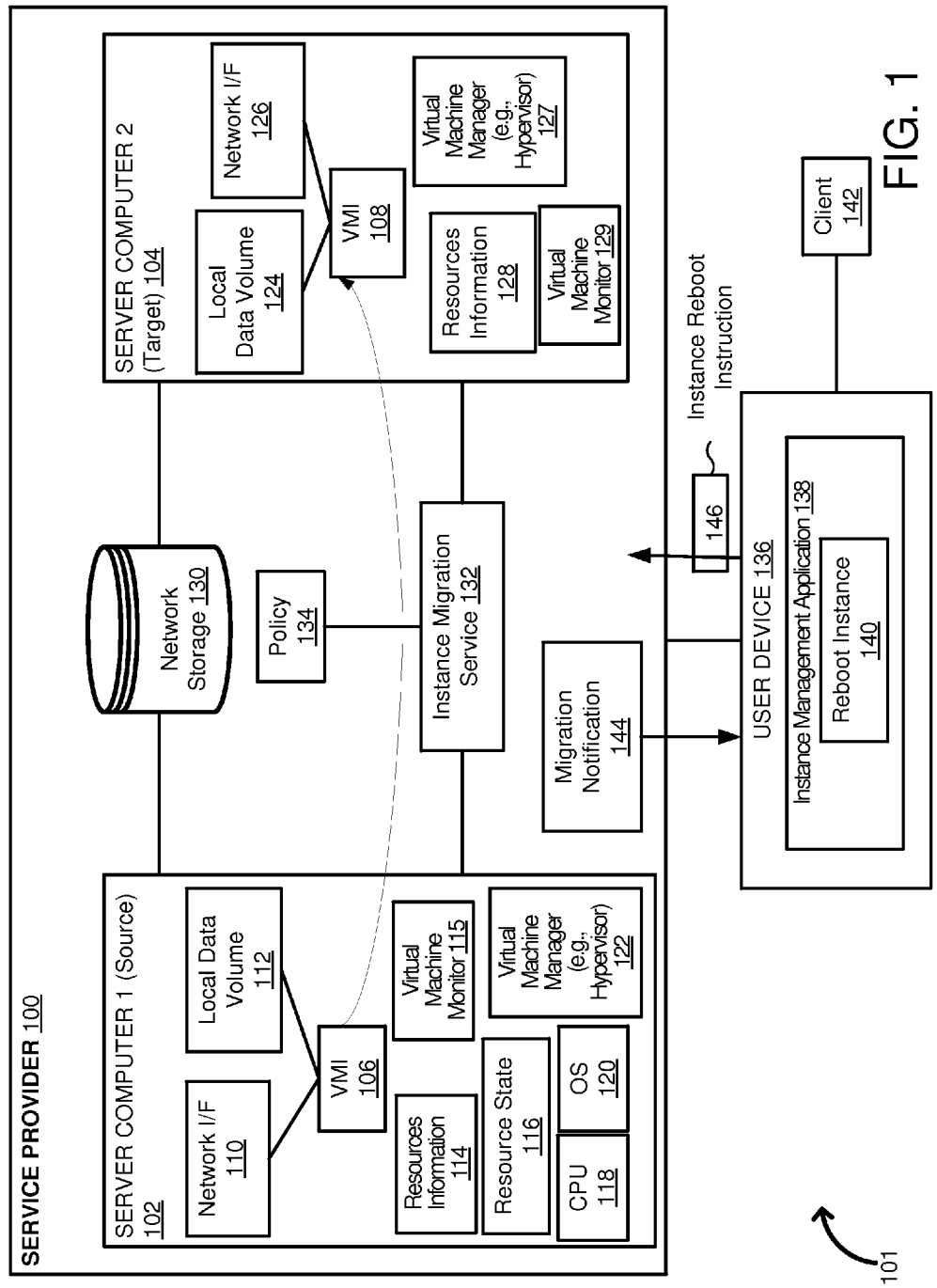
FIG. 1 is a diagram of an example network environment supporting reboot-initiated virtual machine instance migration, in accordance with an embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment.

As used herein, the terms "instance", "virtual machine" and "virtual machine instance" (or VMI) are interchangeable.

As used herein, the term "resources" refers to hardware resources associated with a server computer running one or more virtual machine instances (e.g., CPU, memory, disk storage or other type of storage, network card, and so forth) and/or software resources (e.g., one or more applications and/or operating system running on the virtual machine). The term "resources" (e.g., VMI resources) may refer to a specific configuration of a VMI (e.g., as offered for rent to a customer of a compute service provider). The term "resource state" may refer to state information associated with one or more resources of a virtual machine (and/or a server) at a given point in time, which state information may be stored for subsequent use (e.g., in network storage or in a local storage attached to a server computer and associated with an instance).

As used herein, the terms "moving" or "migrating" a virtual machine refer to moving a virtual machine from one server computer to another server computer (e.g., virtual machine is terminated, or otherwise suspended, from running at the current server computer and is launched at another server computer), or re-launching the virtual machine at the same server computer (e.g., virtual machine is terminated, or otherwise suspended, from running at the current server computer, state of one or more resources of the server computer may be changed, and the virtual machine may be re-launched at the same server computer).

The following description is directed to techniques and solutions supporting reboot-initiated migration of virtual machine instances (or VMIs) in a network environment, such as a cloud computing multi-tenant network environment or another service provider environment. After a determination that a given server computer may need to shut down (e.g., for maintenance), one or more VMIs may be identified that are running on the server (source server) that has to be disconnected. Based on resource settings for the source server (and/or settings associated with the one or more VMIs), a new (target) server may be selected. A first local drive (e.g., a drive connected to the motherboard of the source sever) associated with the one or more VMIs may be used at the source server for storing state data for the one or more VMIs. A second local drive may be attached to the target server (e.g., the motherboard of the target server) and the state data from the first local drive may be copied to the second local drive. Thereafter, the second local drive may be kept in sync with (i.e., periodically synchronized) with the first drive. After the two drives are initially synchronized, a notice may be communicated to the customer running the one or more identified VMIs, notifying the customer that a migration of the VMIs to a different server may be performed at a future date (or may be performed at any time the customer reboots the one or more VMI). A virtual machine manager (e.g., a hypervisor or management domain) running on the source server may then intercept a reboot request for the one or more VMIs. Upon intercepting the reboot request, the one or more VMIs may be shut down from the source server (first local drive may be synced for a last time with state data and disconnected, network interfaces are disconnected, network storage drives are disconnected), and may be re-launched on the target server (second local drive is connected to the re-launched one or more VMIs, previous network interfaces are re-connected, network storage drives are re-connected). The customer may be notified that the one or more VMIs are rebooted on the new (target) server.

FIG. 1 is a diagram of an example network environment supporting reboot-initiated virtual machine instance migration, in accordance with an embodiment of the disclosure. Referring to FIG. 1, the example network environment 101 may comprise a compute service provider 100, a client (or a customer of the service provider) 142, and a user device 136 used by the client. The compute service provider 100 (which is discussed in greater detail in reference to FIG. 4 below) may comprise a plurality of server computers, such as 102-104. The service provider 100 may be a multi-tenant cloud network environment where one or more clients (e.g., client 142) may run one or more virtual machine instances (VMIs) (e.g., VMI 106) on one or more of the server computers (e.g., VMI 106 running on server computer 102). The VMI 106 may also have attached one or more network interfaces 110 as well as a local data volume 112. The local data volume 112 is a physical storage device attached to the server computer 102. A virtual representation of the physical storage device may be represented to one or more VMIs (e.g., VMI 106) running on the server computer 102. Similarly, the local data volume 124 is a physical storage device attached to the server computer 104. A virtual representation of the physical storage device may be represented to one or more VMIs (e.g., VMI 108) running on the server computer 104.

Each of the server computers (e.g., 102) may comprise suitable logic, circuitry, interfaces, and/or code and may be operable to run the VMIs (e.g., 106) using computing resources 114. The server computer 102 may comprise a virtual machine instance manager (or virtual machine manager, "VMM") 122, which may include code operable to run one or more VMIs on the server computer 102. In example embodiment, the VMM 122 may be a hypervisor. The resources information block 114 of each server computer 102 may comprise, for example, information identifying/describing the central processing unit (or CPU 118), memory (e.g., on-chip and/or off-chip memory), storage (e.g., disk storage, remote storage, and so forth), as well as any other computer resources used by each server computer 102. Similarly, a VMM 127 may include code to run one or more VMIs on the server computer 104.

The server computer 102 may also comprise a virtual machine monitor 115, which can include suitable logic, circuitry, interfaces, and/or code and may be operable to handle migration of data associated with one or more VMIs (e.g., VMI 106) from one server computer (e.g., 102) to another (e.g., 104). More specifically, a similar virtual machine monitor 129 may be present on server 104 and both monitors 115 and 129 may communicate with each other to transfer data in connection with VMI migration between servers 102 and 104.

For each of the VMIs (e.g., VMI 106), the resources 114 may be characterized with specific resource state information 116 associated with resource state for the VMI 106 at a given time point. The resource state 116 may be implemented as a separate module operable to report state information for a given VMI (e.g., VMI 106) running on the server computer 102 at a given time point. Alternatively, resource state information 116 may be obtained and reported by the CPU 118, the operating system (OS) 120, and/or the virtual machine manager 122 (which may have similar functionalities to the virtual machine manager 408 as described in reference to FIG. 4). In some instances, a local data volume 112 (e.g., a local disk drive, a partition on a local disk drive, or other type of local storage) may be attached to the VMI 106 for storing resource state information (e.g., 116), including memory and processor state associated with the VMI 106. Additionally, a network storage drive 130 may also be attached to the VMI 106.

The instance migration service (IMS) 132 within the service provider 100 may comprise suitable logic, circuitry, interfaces, and/or code and may be operable to coordinate and/or perform instance migration functions. More specifically, the IMS 132 may obtain information (e.g., from a network administrator) identifying a server that has to be shut down (e.g., for maintenance). The IMS 132 may then identify the VMIs running on such server, determine a new server (e.g., by matching server resources) for migrating the VMIs, synchronize one or more local drives attached to the first server with a local drive attached to the new server, and notify the customer running the VMIs that a migration of the VMIs may take place at a subsequent future date (or that a migration of the VMIs will take place if the customer initiates a reboot of the VMIs).

The IMS 132 may also be operable to detect a reboot of the VMIs initiated by the customer (e.g., a reboot outside of, or independent of, the VMIs or a reboot initiated from within the VMIs). Upon detecting the reboot, the IMS 132 may perform a final synchronization of the local drives, disconnect any network interfaces or network storage drives from the VMIs, shut down the VMIs running on the first server and re-launch them on the new server, and then reconnect the network interfaces, the local drive of the new server, and any network storage drive to the newly re-launched VMIs. The IMS 132 may also communicate a notification to the client that the VMI migration has been completed and the VMIs are running on a new server.

Even though reference numerals 114 and 116 in FIG. 1 are discussed as resource information and resource state information, respectively, these numerals may also refer to a module, block, and/or service providing the respective information. For example, a resources module (or service) 114 may comprise suitable circuitry, logic, and/or code and may be operable to provide information on one or more hardware and/or software resources used by the server computer 102 to run a VMI. Similarly, the resource state module (or service) 116 may comprise suitable circuitry, logic, and/or code and may be operable to provide resource state information for one or more of the resources.

In an example embodiment, the instance migration service 132 may use a policy 134, which may describe one or more settings for automatic generation of migration profiles for a given customer, virtual machine and/or server computer. For example, the client 142 may set up the policy 134 so that the local data volumes attached to the source and target server computers (e.g., 112 and 124) are synchronized at a determined time interval. The policy 134 may also specify other rules associated with instance migration functionality described herein (e.g., rules for matching resource data of a source server to other servers in order to select a target server, VMI disconnect and re-launch sequences, client/customer notifications, and so forth). The policy 134 may be stored in a database used by the instance migration service 132 or in any other storage accessible within the service provider 100. An example instance migration using the IMS 132 is explained in greater detail below in reference to FIG. 3.

Figure 2:
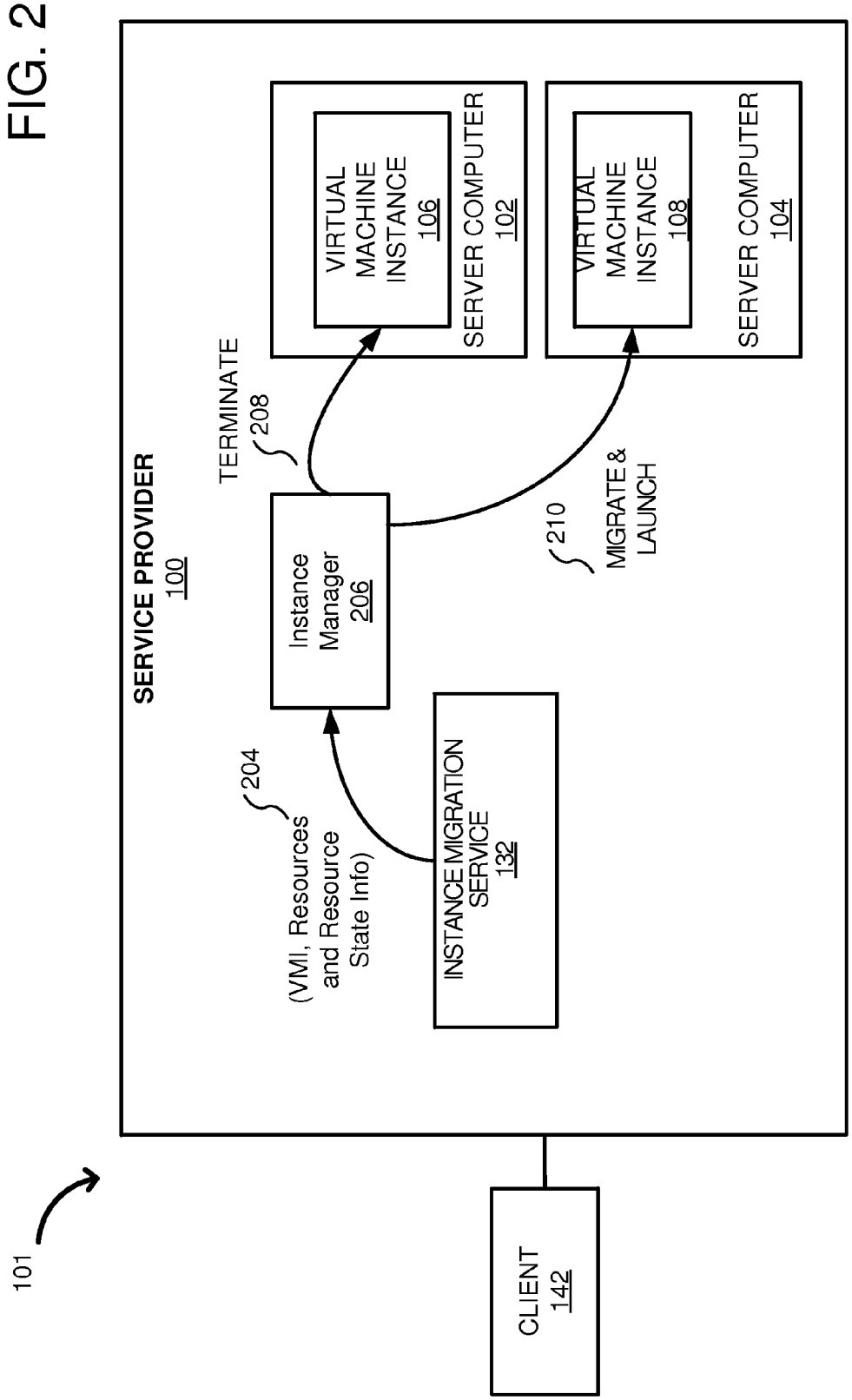
FIG. 2 is a block diagram of an example service provider environment with an instance migration service supporting virtual machine migration, in accordance with an embodiment of the disclosure.

FIG. 2 is a block diagram of an example service provider environment with an instance migration service supporting virtual machine migration, in accordance with an embodiment of the disclosure. Referring to FIG. 2, during an example VMI migration, the instance migration service 132 may obtain information identifying a VMI that has be migrated (e.g., 106), resources information (e.g., hardware and/or software resources 114 for the server computer 102 running the VMI 106), and resource state information (e.g., 116), which may be communicated (e.g., as information 204) to the instance manager 206.

The instance manager 206 may comprise suitable circuitry, logic, and/or code and may be operable to manage one or more VMIs within the compute service provider 100. A more detailed description of the functionalities of the instance manager is provided herein below in reference to FIG. 5. More specifically, the instance manager 206 (which may be similar to instance manager 550) may control launching and termination of virtual machine instances in the service provider environment 100. When an instruction is received (such as through an API request) to launch an instance, the instance manager 206 determines available resources from, e.g., a capacity pool of VMIs and launches the instance on a decided upon host server computer. The instance manager 206 may also terminate one or more VMIs, then migrate and launch the VMIs on another server computer based on, e.g., instructions from the instance migration service 132.

After the instance manager 206 receives the VMI identification information, the resources information, and the resource state information (collectively, 204), the instance manager may cause the migration of the VMI 106 from server computer 102 to server computer 104 to start. More specifically, the instance manager 206 may use the information 204 to select the target server computer 104 so that its resources match the resources of the source server computer 102 and send a message to the virtual machine monitor 115 running on server 102 to start migrating the block data stored on the local disk to server computer 104. Similarly, instance manager 206 may send a message to the virtual machine monitor 129 running on server 104 indicating that a migration of an instance from server 102 will be coming. In an example embodiment, both the instance manager 206, the virtual machine monitors 115 and 129, and the instance migration service 132 may include application program interfaces ("APIs") that can be used to receive requests. After the virtual machine monitors 115 and 129 receive migration notification messages, the virtual machine monitor 115 on server computer 102 can open a connection to virtual machine monitor 129 on server computer 104 and use it to start copying block data to server computer 104. After the local disk volumes associated with servers 102 and 104 (e.g., 112, 124) are synchronized (e.g., the block storage used by the instance 106 has been copied to the target server 104), virtual machine monitor can report that the instance is ready for a reboot migration and send a message to instance migration service 132, a migration notification (e.g., 144) can then be sent to client 142. If the customer reboots the instance (e.g., either by going to a service provider console and selecting reboot, logging into the instance and rebooting it, or replying to the notification with a "reboot proceed" command), the virtual machine monitor 115 on server computer 102 will detect a reboot event and store any additional state (e.g., any input and output operations that the operating system in the instance makes before shutting down) to disk (e.g., 112) as part of the shut-down and reboot procedure. After the instance has been shut-down, instead of rebooting the instance the virtual machine monitor 115 can report the reboot to instance migration service 132 and copy the additional state to server computer 104. Instance migration service 132 may receive the message from server computer 102 and, at 208, terminate the VMI 106 on server 102, and migrate and launch (at 210) the terminated VMI as VMI 108 on the server 104. In example embodiment, the IMS 132 may be implemented as part of the instance manager 206. Additionally, even though FIG. 2 illustrates that the migration of VMIs is performed by the instance manager 206, the present disclosure is not limited in this regard and the migration may be performed in part, or entirely, by the instance migration service 132.

Figure 3:
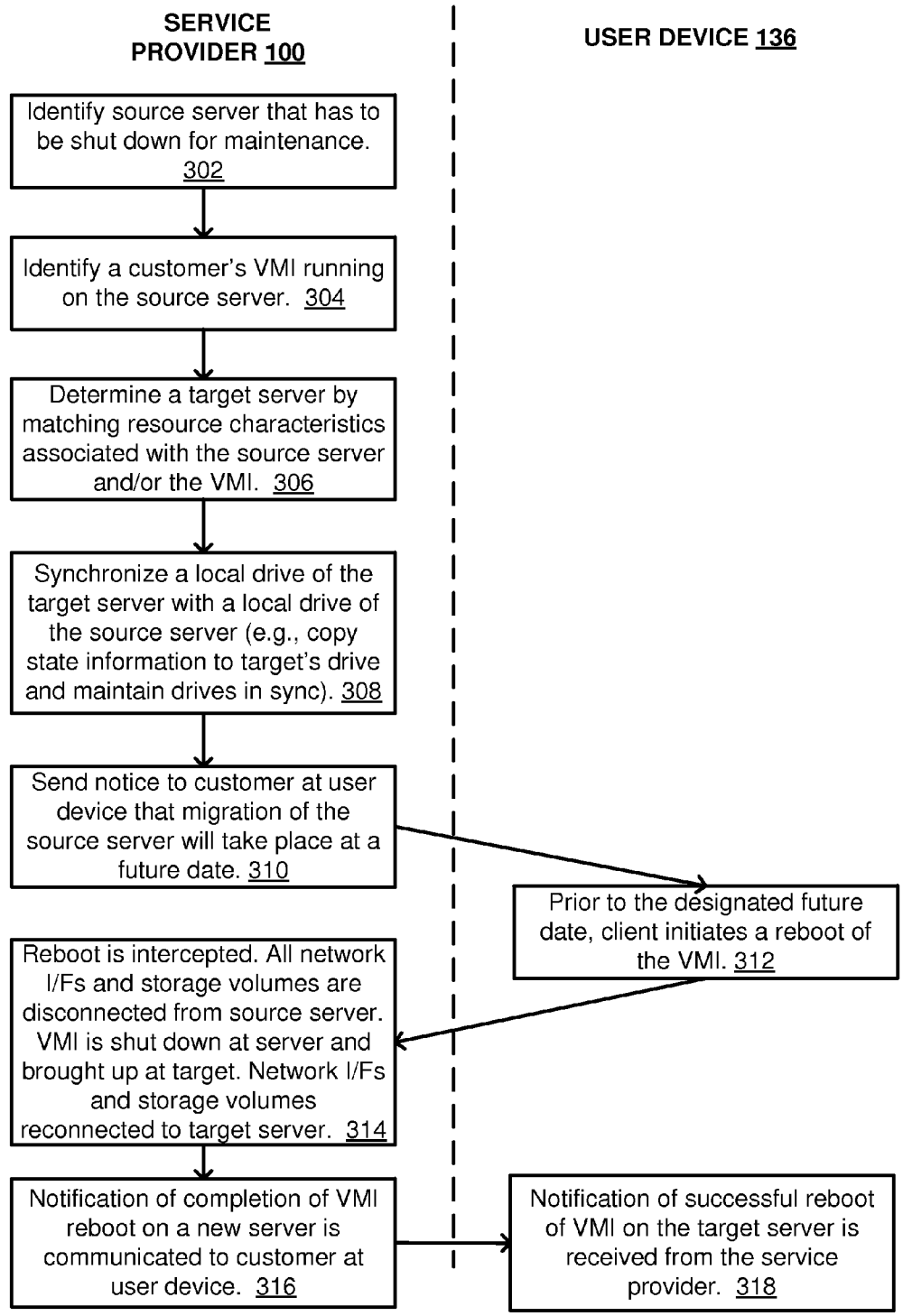
FIG. 3 is a flow diagram illustrating example steps used for reboot-initiated virtual machine instance migration, in accordance with an example embodiment of the disclosure.

FIG. 3 is a flow diagram illustrating example steps used for reboot-initiated virtual machine instance migration, in accordance with an example embodiment of the disclosure. Referring to FIGS. 1 and 3, at 302, the IMS 132 may identify that a source server (e.g., 102) has to be disconnected or shut down (e.g., due to maintenance). At 304, the IMS 132 in the service provider 100 may identify the VMIs running on the source server 102 (e.g., VMI 106 of client/customer 142). For example, the IMS 132 may access a database that lists the instances currently hosted by server 102. At 306, the IMS 132 may match the resources data 114 with resource data of one or more other server computers to find a target server. More specifically, the resources 114 of source server 102 may match resources 128 of target server 104. The target server 104 may be selected for migrating the VMI 106. At 308, a local data volume 112 may be synchronized with a local data volume 124 attached to the target server 104. More specifically resource state information 116 (including memory and processor state associated with the VMI 106 as well as other state information for the server 102 and/or the VMI 106) may be stored in the local data volume 112 (e.g., a local disk drive). During 308, the state data 116 stored in the local data volume 112 may be copied to the local data volume 124 attached to server 104.

After the initial copy, the virtual machine monitors (115 and 129) of each server may keep the local data volume 124 synchronized with the local data volume 112 (e.g., upon any change in the content stored in volume 112, the virtual machine monitor 115 may send data indicative of the change to the target server and the virtual machine monitor 129 on the target server 104 may apply the change to volume 124). At 310, the IMS 132 may send a migration notification 144 to the client 142 at user device 136. The notification 144 may be a notification that VMI 106 will be shut down and migrated at a future date. The notification 144 may further provide an option to the client 142 to initiate the VMI 106 migration at any time prior to the future date by initiating a reboot operation on the VMI 106.

The client 142 may be using user device 136 to run an instance management application 138 for purposes of managing the instances (e.g., 106) of the client. The application 138 may provide a software button (or another indication) 138 for initiating an instance reboot. At 312, the client 142 may initiate a reboot of VMI 106 by activating (or selecting) the button 140. Upon activation of the button 140, an instance reboot instruction 146 is communicated to the service provider 100. Similarly, the notification could include a link that can be selected by the client 142 to initiate a reboot of the VMI 106. In the embodiment where the notification is an email or text-based message, the button could include a hyperlink to an application program interface. Selecting the hyperlink can cause a web service request to be sent to the application program interface indicating that the customer has requested a reboot. At 314, the virtual machine monitor 115 running on the source server 102 may intercept the reboot instruction 146 and initiate migration. More specifically, the virtual machine monitor 115 can disconnect the network interfaces 110 from VMI 106 and can copy the last amount of state written to storage 112 by the instance when it shut down. After performing a last synchronization of current state information, the local data volume 112 may be disconnected. The network storage volume 130 may also be disconnected from the VMI 106. The VMI 106 may then be re-launched as VMI 108 on server 104. The network interfaces 126 (which may be the same as 110), the local data volume 124, and the network storage volume 130 may be re-connected to the VMI 108. At 316, a notification 144 of successful VMI migration may be communicated from the IMS 132 to the user device 136. At 318, the notification 144 may be received at the user device 136.

Figure 4:
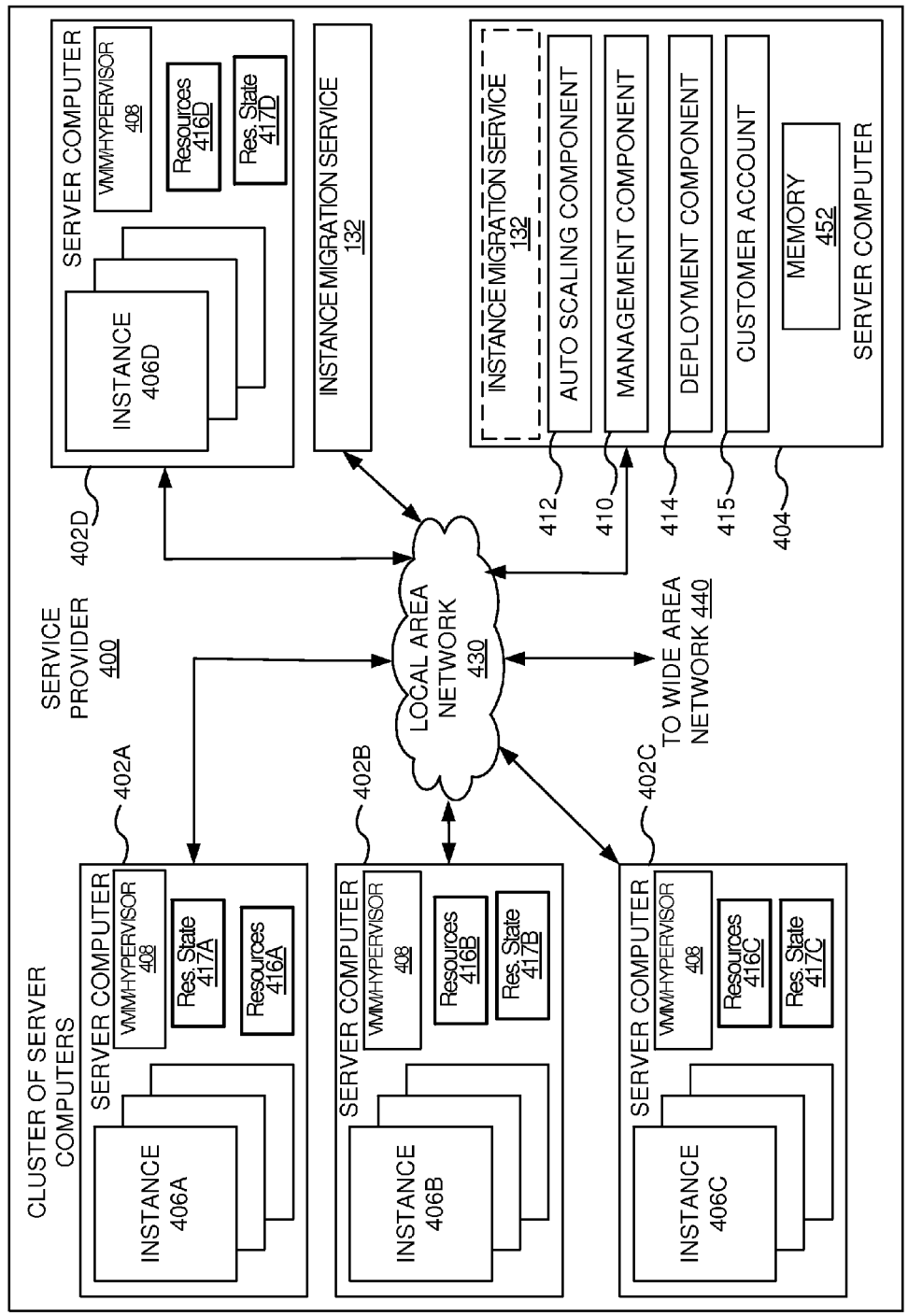
FIG. 4 is an example system diagram showing a plurality of virtual machine instances running in a multi-tenant environment, using an instance migration service, in accordance with an example embodiment of the disclosure.

FIG. 4 is an example system diagram showing a plurality of virtual machine instances running in a multi-tenant environment, using an instance migration service, in accordance with an example embodiment of the disclosure. More specifically, FIG. 4 is a computing system diagram of a network-based compute service provider 400 that illustrates one environment in which embodiments described herein can be used. By way of background, the service provider 400 (i.e., the cloud provider) is capable of delivery of computing and storage capacity as a service to a community of end recipients (e.g., tenants or customers).

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the service provider 400 using networked customer devices, such as desktop computers, laptops, tablets, smartphones, etc. running web browsers or other lightweight customer applications. Those skilled in the art will recognize that the service provider 400 can be described as a "cloud" environment.

The particular illustrated service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

In an example embodiment, each of the server computers 402A-402D may also comprise resources module (416A-416D) and resource state module (417A-417D). The resources module 416 may comprise suitable circuitry, logic, and/or code and may be operable to provide information on hardware and/or software resources within the server computer 402. The resources state module 417 may comprise suitable circuitry, logic, and/or code and may be operable to provide state information for one or more of the hardware and/or software resources of the server computer 402 (and/or the instances running on the server) at a given point in time. Functionalities of the modules 416 and 417 are similar to the functionalities of modules 114 and 116, respectively, as discussed above in reference to FIG. 1.

Figure 5:
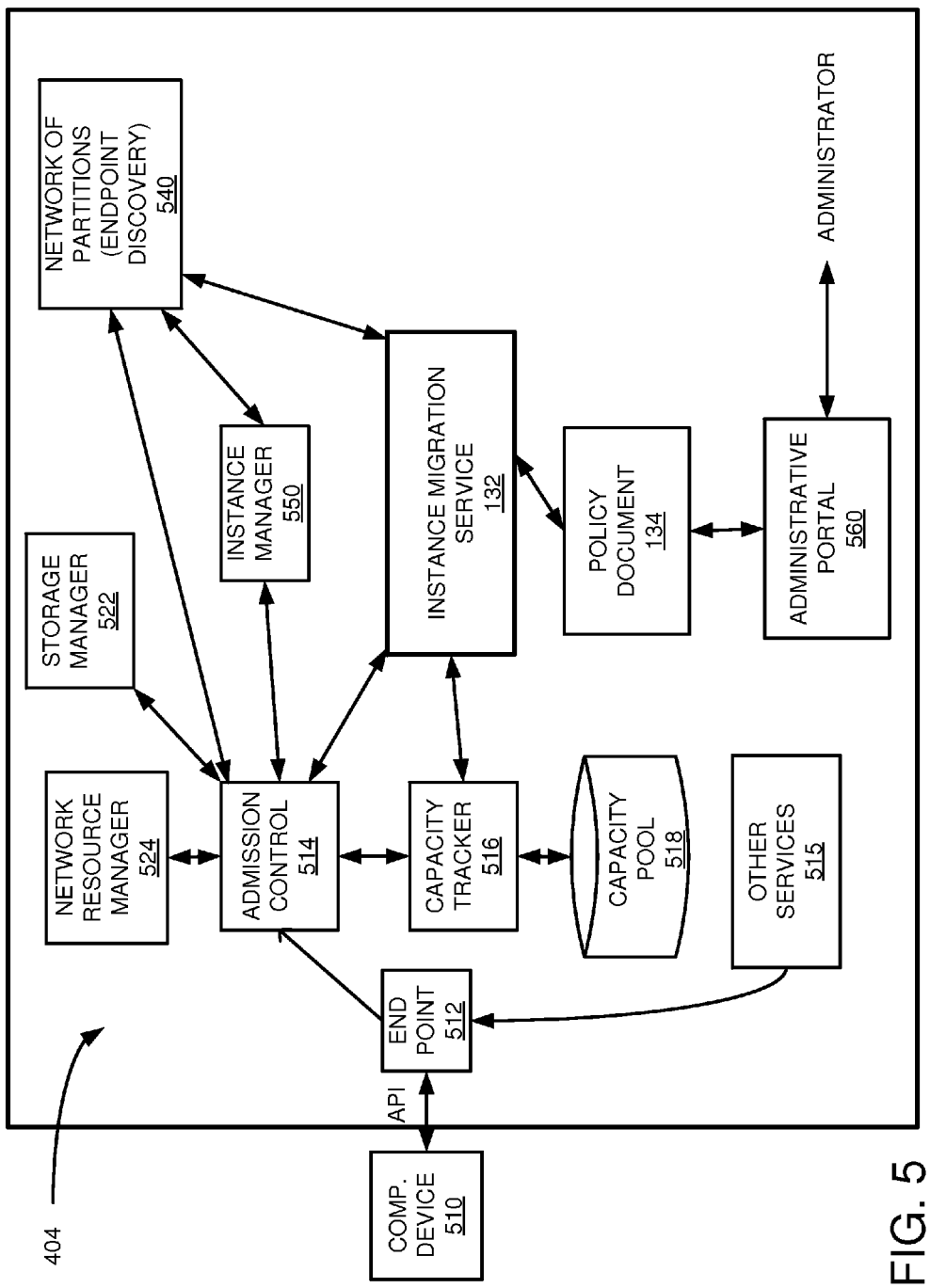
FIG. 5 shows further details of an example system including a plurality of management components associated with a control plane, which may be used to migrate one or more virtual machine instances according to one embodiment.

The compute service provider 400 may also comprise an instance migration service 132. The instance migration service 132 may comprise suitable circuitry, logic, and/or code and may be operable to perform the functionalities described herein (e.g., in reference to FIGS. 1-3) including migrating one or more virtual machine instances (e.g., 406) from one server computer to another server computer using the resource state information. The instance migration service 132 may be implemented as a stand-alone service within the provider 400, as a dedicated server (similar to the servers 402A-402D), and/or may be implemented as part of the server computer 404 that performs management functions. For example, the instance migration service 132 may be implemented as part of the management component 410 (as seen in FIG. 5).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the instance migration service 132. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component 410 can further include a policy document (e.g., 134 in FIGS. 1 and 5) to implement migration-related policies as described in reference to FIG. 1.

The server computer 404 may further comprise memory 452, which may be used as processing memory by the discontinuous migration service 120. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the compute service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to migrate one or more virtual machine instances according to one embodiment. More specifically, FIG. 5 illustrates in further detail the management plane of the server computer 404, which may implement the instance migration service 132 within the multi-tenant environment of the service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the compute service provider 400 through an end point 512, which can be a DNS address designed to receive and process application programming interface (API) requests. In particular, the end point 512 can be a web server configured to expose an API. Using the API requests, a customer device 510 can make requests to implement any of the functionality described herein (e.g., request a reboot to initiate an instance migration). Other services 515, which can be internal to the compute service provider 400, can likewise make API requests to the end point 512. For example, the customer device 510 may use the API requests to communicate a customer request associated with an instance migration. The API requests from the client 114 can pass through the admission control 514 and onto the discontinuous migration service 120 in order to access the policy document 134 and/or to request migration-related services. An administrative portal 560 can be used to access and make changes to the policy document 134 by an administrator of either the customer or the compute service provider 400.

Other general management services that may or may not be included in the compute service provider 400 (and/or within the management component 410) include an admission control 514, e.g., one or more computers operating together as an admission control web service. The admission control 514 can authenticate, validate and unpack the API requests for service or storage of data within the compute service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

The instance migration service 132 may perform the migration-related functionalities described herein. The IMS 132 may communicate with the capacity tracker 516 to receive information regarding available partitions and/or host servers that can be used for migrating and launching an instance (or other network resources requested by a customer entity). Additionally, communications with the admission control 514 may be used to detect reboot requests and communicate notifications to the customer, and communications with the network of partitions 540 may be used to perform migration-related functionalities affecting a plurality of partitions (e.g., a plurality of instances running on such partitions associated with one or more server computers).

Figure 6:
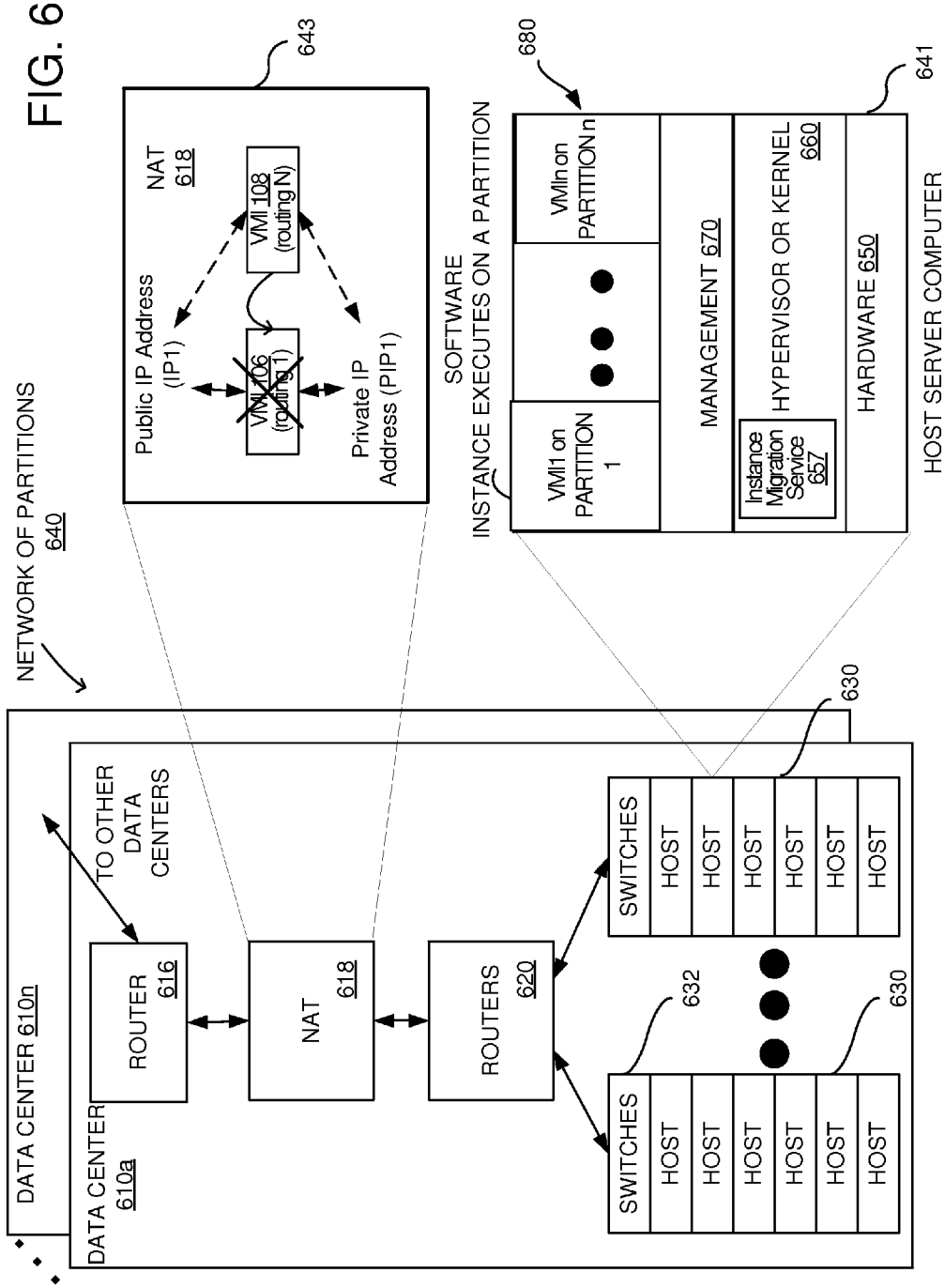
FIG. 6 shows an example of a plurality of host computers, routers, and switches—which are hardware assets used for running virtual machine instances—with the host computers having migration-related functionalities that may be configured according to one embodiment.

FIG. 6 shows an example of a plurality of host computers, routers, and switches—which are hardware assets used for running virtual machine instances—with the host computers having migration-related functionalities that may be configured according to one embodiment. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a.

Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650, which may include a network interface card, one or more CPUs, memory, and so forth (not illustrated in FIG. 6). Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions.

In accordance with an example embodiment of the disclosure, discontinuous migration service functionalities 657 may be part of the hypervisor 660 and may be used to implement VMI migration-related functionalities as described herein. The discontinuous migration service functionalities 657 may include the functionalities associated with, for example, the discontinuous migration service 120, the resources module 124, and/or the resource state module 126.

Additionally, when a virtual machine instance (e.g., VMI1) is migrated (e.g., re-launched as VMIn on a partition at another host server computer), the newly launched VMIn will be associated with the same public and private IP addresses as was used for VMI1. This is illustrated at the expanded view 643 of the NAT 618. As seen at 643, even though each VMI (or each server running the VMI) may be associated with its own private IP address, after the migration takes place (e.g., VMI1 is terminated (or suspended) and replaced with VMIn, as VMIn is launched at the same or different host server computer), the newly launched VMIn has the same public IP address (e.g., IP1) and private IP address (PIP1) as previously used by the terminated (or suspended) VMI1. Additionally, routing information (i.e., routing information for the specific server computer hosting the VMI) may remain different (e.g., routing information "routing 1" is associated with VMI1 and routing information "routing n" is associated with VMIn) even though private and public IP addresses of VMI1 and VMIn after the migration remain the same.

Figure 7:
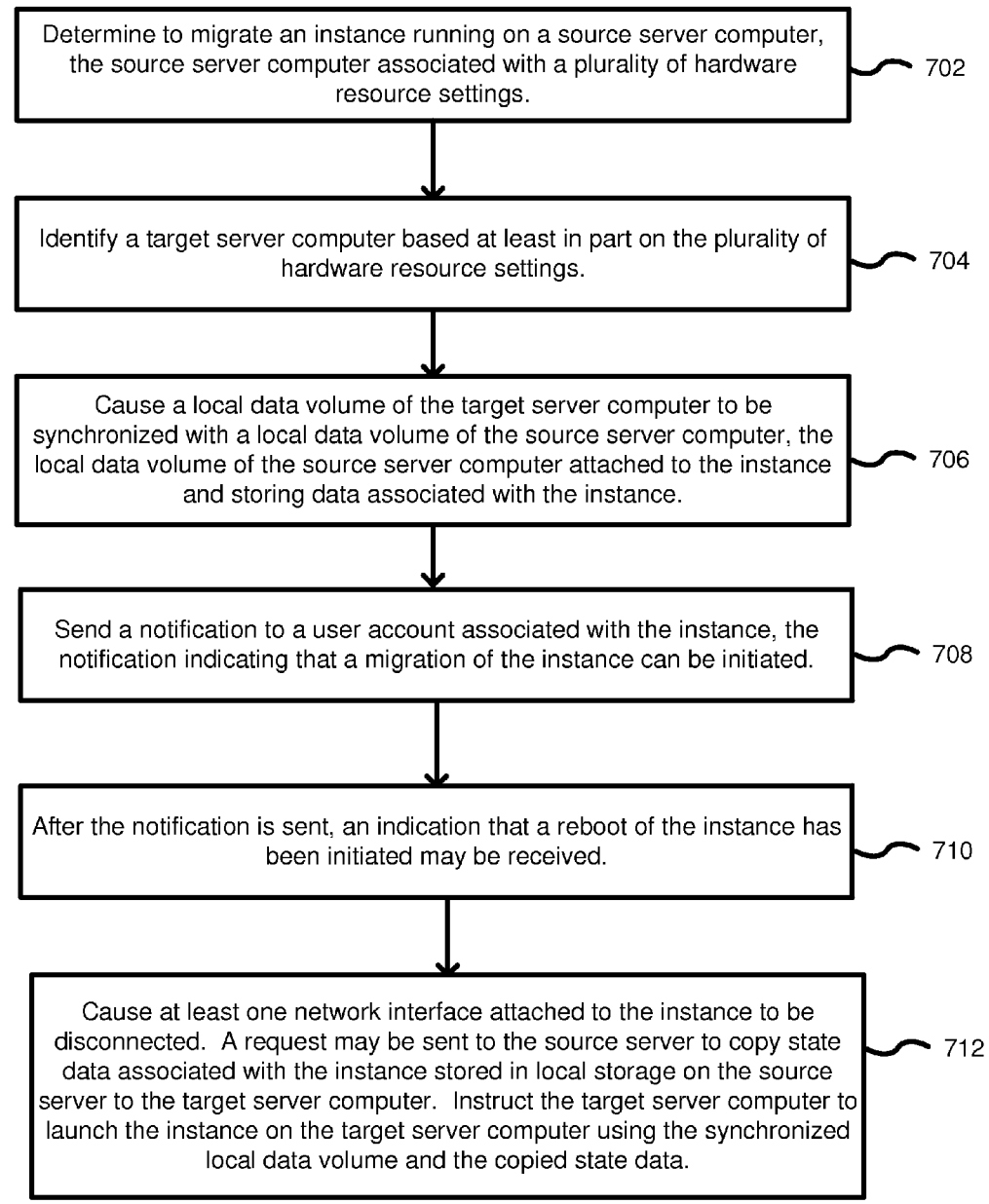
FIGS. 7-8 are flowchart of example methods of migrating a virtual machine instance (VMI) from a first server computer to a second server computer, in accordance with an embodiment of the disclosure.
Figure 8:
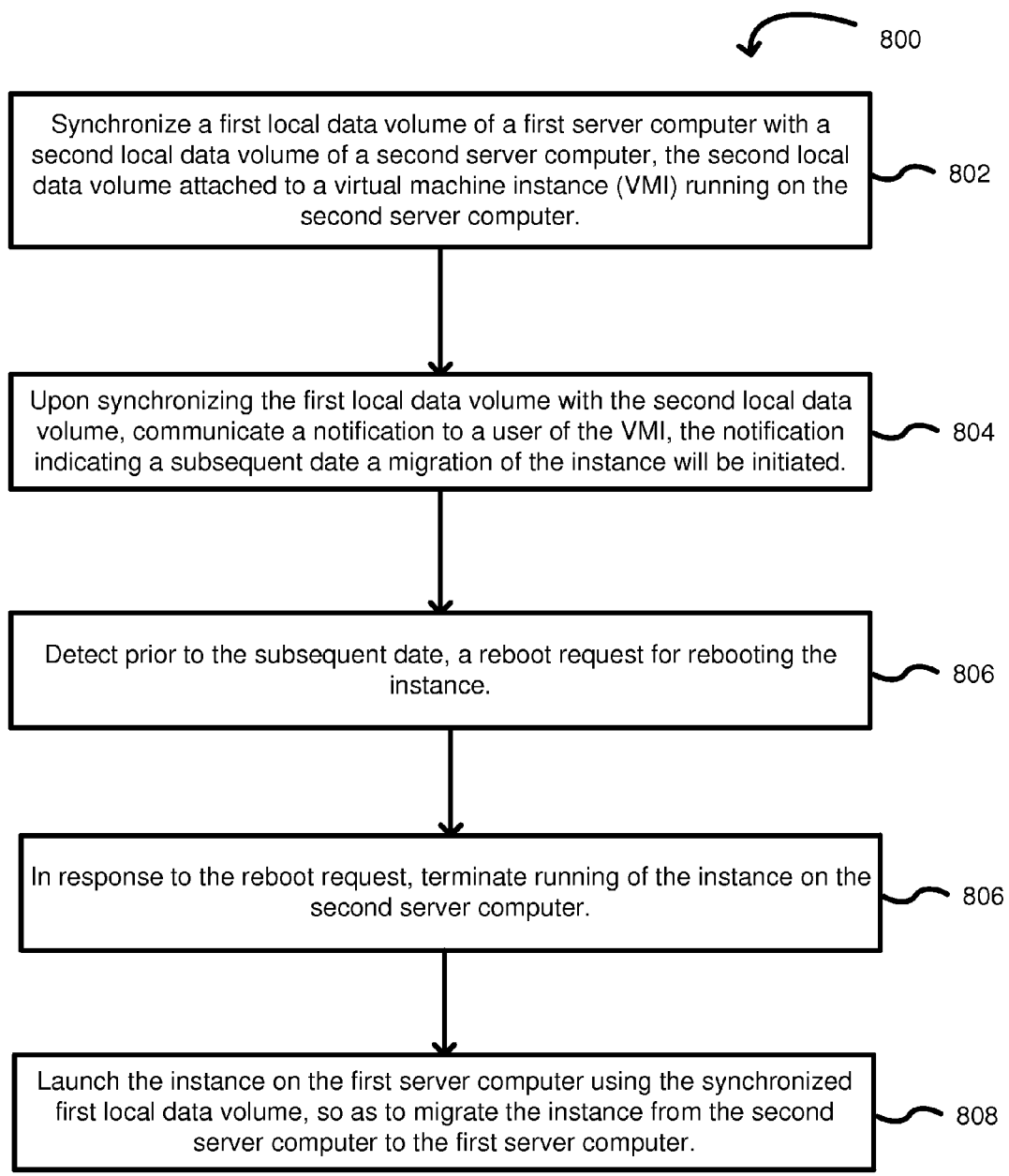

FIGS. 7-8 are flowchart of example methods of migrating a virtual machine instance (VMI) from a first server computer to a second server computer, in accordance with an embodiment of the disclosure. Referring to FIGS. 1 and 7, the example method 700 may start at 702, when the IMS 132 may determine to migrate an instance (e.g., 106) running on a source server computer. The source server computer (e.g., 102) may be associated with a plurality of hardware resource settings (e.g., settings associated with resources 114). At 704, the IMS 132 may identifying a target server computer (e.g., 104) based at least in part on the plurality of hardware resource settings (e.g., by matching resources 114 with resources 128). At 706, the IMS 132 may cause a local data volume (e.g., 124) of the target server computer to be synchronized with a local data volume (e.g., 112) of the source server computer (102). The local data volume (112) of the source server computer (102) may be attached to the instance (106) (e.g., sometimes called "instance store data") and may be used to store data associated with the instance, state data associated with the resources identified by resource information 114, and/or data associated with a user of the instance 106.

At 708, the IMS 132 may send a notification (e.g., 144) to a user account (e.g., of user 142 at device 136) associated with the instance. The notification (144) may indicate that migration of the instance (106) can be initiated. At 710, after the notification is sent, the IMS 132 may receive an indication that a reboot of the instance has been initiated.

At 712, the at least one network interface (e.g., 110) attached to the instance may be disconnected. The IMS 132 may send a request to the source server computer 102 to copy state data associated with the instance 106 stored in local storage 112 on the source server computer to the target server computer 104. The IMS 132 may instruct the target server computer 104 to launch the instance (e.g., 108) on the target server computer using the synchronized local data volume and the copied state data.

Referring to FIGS. 1 and 8, the example method 800 may start at 802, when the IMS 132 may synchronize a first local data volume (124) of a first server computer (104) with a second local data volume (112) of a second server computer (102). The second local data volume (112) may be attached to a virtual machine instance (VMI 106) running on the second server computer and may store, for example, instance data associated with the VMI 106, state data associated with resources 114, and/or data associated with a user of the VMI (e.g., user 142). At 804, upon synchronizing the first local data volume with the second local data volume, the IMS 132 may communicate a notification (144) to the user (142). The notification (144) may indicate a subsequent date a migration of the instance (106) will be initiated. At 806, the IMS 132 may detect prior to the subsequent date, a reboot request (146) for rebooting the instance. At 806, the IMS 132 may terminate running of the instance (106) on the second server computer (102). At 808, the IMS 132 may launch the instance on the first server computer (104) using the synchronized first local data volume (124), so as to migrate the instance (106) from the second server computer (102) as instance (108) running on the first server computer (104).

For example, an instance migration service can send a notification to a user that migration will happen at a particular time in the future (e.g., a particular day or a particular time on a particular day). The notification can be provided in the form of an email, an instant message, an alert within a management system, a phone call, or in another format. The notification can be provided once the target instance is ready to accept the migration (e.g., once the virtual machine instance has been setup, including local data volume synchronization, on the target system). The notification can indicate that the user (e.g., a contact, such as an administrator, associated with the instance) can initiate the migration earlier than the particular time in the future (e.g., a message such as "Your instance will be automatically migrated on Sep. 15, 2015 at 10:00 PM pacific time. To initiate a reboot migration before this time, click here."). Providing the user an option to migrate sooner than the scheduled time (e.g., the scheduled time may be days or weeks in the future) can provide benefits. For example, the user may be able to initiate the reboot migration at a time when the instance is not in active use (e.g., to minimize impact of the migration). In addition a service provider may benefit from systems that are freed up sooner than the scheduled time for maintenance or retirement (e.g., equipment end-of-life).

FIG. 9 depicts a generalized example of a suitable computing environment in which the described innovations may be implemented. Referring to FIG. 9, the computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations (e.g., functionalities) described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, JAVA, PERL, JAVASCRIPT, ADOBE FLASH, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A computer-readable storage medium including instructions that upon execution cause a computer system to:
    determine to migrate an instance running on a source server computer, the source server computer associated with a plurality of hardware resource settings;
    identify a target server computer based at least in part on the plurality of hardware resource settings;
    synchronize a local data volume of the target server computer with a local data volume of the source server computer, the local data volume of the source server computer attached to the instance and storing data associated with the instance;
    upon synchronizing the local data volume, send a notification to a user account associated with the instance, the notification indicating that a migration of the instance can be initiated;
    after the notification is sent, receive an indication that a reboot of the instance has been initiated;
    disconnect the at least one network interface attached to the instance, upon receiving the indication that the reboot of the instance has been initiated;
    send a request to the source server computer to copy state data associated with the instance stored in local storage on the source server computer to the target server computer;
    terminate the instance from the source server computer; and
    instruct the target server computer to launch the instance on the target server computer using the synchronized local data volume and the copied state data.

2. The computer-readable storage medium according to claim 1, wherein the notification comprises an indication of a future time the migration will take place unless the user responds prior to the indicated future time.

3. The computer-readable storage medium according to claim 1, wherein the instructions, upon execution further cause the computer system to:
    cause the at least one network interface to reconnect to the instance running on the target server computer.

4. The computer-readable storage medium according to claim 1, wherein the state data comprises one or both of operation system data and application data written to storage during a shut-down procedure.

5. The computer-readable storage medium according to claim 1, wherein the instructions, upon execution further cause the computer system to:
    maintain synchronization of the local data volume of the target server computer with the local data volume of the source server computer until the launching of the instance on the target server computer.

6. The computer-readable storage medium according to claim 1, wherein the hardware resource settings comprise one or more of server storage capacity, server memory capacity, and server processor speed, and the method further comprises:
    identifying the target server computer by matching at least a portion of the hardware resource settings of the source server computer to hardware resource settings of the target server computer.

7. A method for migrating a virtual machine instance within a service provider environment, the method comprising:
    performing by an instance migration service of the service provider environment:
        synchronizing a first local data volume of a first server computer with a second local data volume of a second server computer, the second local data volume attached to a virtual machine instance (VMI) running on the second server computer;
        upon synchronizing the first local data volume with the second local data volume, communicating a notification to a user associated with the VMI, the notification indicating a subsequent date a migration of the instance will be initiated;
        detecting prior to the subsequent date, a reboot request for rebooting the instance;
        in response to the reboot request:
            terminating running of the instance on the second server computer; and
            launching the instance on the first server computer using the synchronized first local data volume, so as to migrate the instance from the second server computer to the first server computer.

8. The method according to claim 7, further comprising:
    storing state data to the second local data volume, the state data associated with one or both of an operating system or at least one application running on the instance, and the state data being available after a shut-down of the instance is initiated;
    copying the state data to the first local data volume; and
    launching the instance on the first server computer using the copied state data.

9. The method according to claim 7, further comprising:
    maintaining synchronization of the first local data volume with the second local data volume until the launching of the instance on the first server computer.

10. The method according to claim 9, wherein maintaining the synchronization comprises:
    periodically duplicating data stored on the second data volume to the first data volume.

11. The method according to claim 7, wherein the notification is communicated to the user automatically upon synchronizing the first local data volume with the second local data volume.

12. The method according to claim 7, further comprising:
    determining to migrate the instance running on the second server computer; and
    selecting the first server computer from a plurality of remaining server computers within the service provider environment by matching resources of the second server computer with resources of the plurality of remaining server computers.

13. The method according to claim 12, wherein the resources comprise one or both of at least one hardware resource of the second server computer and at least one software resource running on the second server computer.

14. The method according to claim 13, wherein:
the at least one hardware resource comprises one or more of a CPU, memory, storage, and/or disk buffer; and
the at least one software resource comprises one or more of an operating system, a hypervisor, and/or at least one application running on the second server computer.

15. The method according to claim 7, further comprising:
assigning an external IP address and a private IP address to the first server computer that are the same as an external IP address and a private IP address for the second host server computer.

16. The method according to claim 7, further comprising: upon receiving the reboot request:
disconnecting at least one network interface attached to the instance; and
disconnecting at least one network data volume attached to the instance.

17. The method according to claim 16, further comprising: upon launching the instance on the first server computer:
re-connecting the at least one network interface and the at least one network data volume to the instance running on the first server computer.

18. A system for migrating a virtual machine instance (VMI) in a multi-tenant environment, the system comprising:
a plurality of server computers coupled together through a network to form the multi-tenant environment, at least a portion of the server computers for executing a plurality of virtual machine instances (VMIs) associated with a customer account; and
an instance migration service coupled to the plurality of server computers, the instance migration service operable to:
determine to migrate an instance running on a source server computer, the source server computer associated with a plurality of hardware resource settings;
identify a target server computer based at least in part on the plurality of hardware resource settings;
synchronize a local data volume of the target server computer with a local data volume of the source server computer, the local data volume of the source server computer attached to the instance and storing state data associated with the instance;
subsequent to synchronizing the local data volume, send a notification to a user of the instance, the notification indicating migration of the instance can be initiated;
detect a reboot request for rebooting the instance;
terminate running of the instance on the source server computer; and
launch the instance on the target server computer using the state data in the synchronized local data volume of the source server computer, so as to migrate the instance from the source server computer to the target server computer.

19. The system according to claim 18, wherein the reboot request is initiated from within the instance, while the instance is running on the source server computer.

20. The system according to claim 18, wherein the instance migration manager is operable to:
automatically send the notification to the user upon synchronizing the local data volume of the target server computer with the local data volume of the source server computer.

* * * * *